C. C. OVERTON.
Reversible Dumping-Scow.

No. 208,629. Patented Oct. 1, 1878.

Witnesses.
Otto Hufeland
Chas. Nahlers.

Inventor.
Charles C. Overton
by
Van Santvoord & Hauff
his attorneys

UNITED STATES PATENT OFFICE.

CHARLES C. OVERTON, OF BROOKLYN, NEW YORK.

IMPROVEMENT IN REVERSIBLE DUMPING-SCOWS.

Specification forming part of Letters Patent No. 208,629, dated October 1, 1878; application filed March 1, 1877.

*To all whom it may concern:*

Be it known that I, CHARLES C. OVERTON, of the city of Brooklyn, county of Kings, and State of New York, have invented a new and Improved Reversible Dumping-Scow, which invention is fully set forth in the following specification, reference being had to the accompanying drawing, in which—

Figure 1:
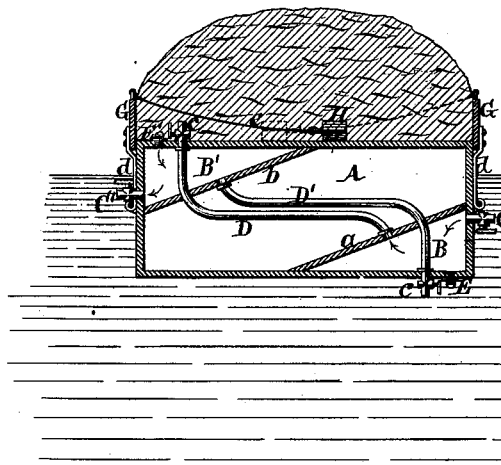
Figure 2:
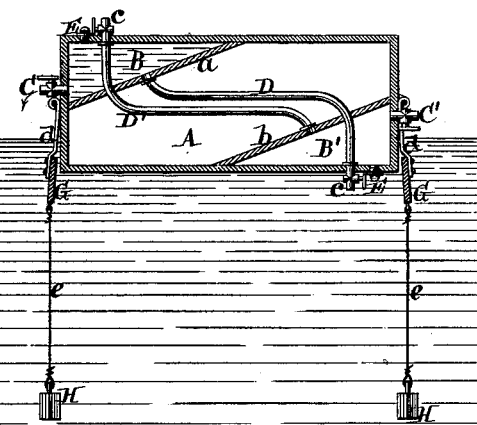
Figure 3:
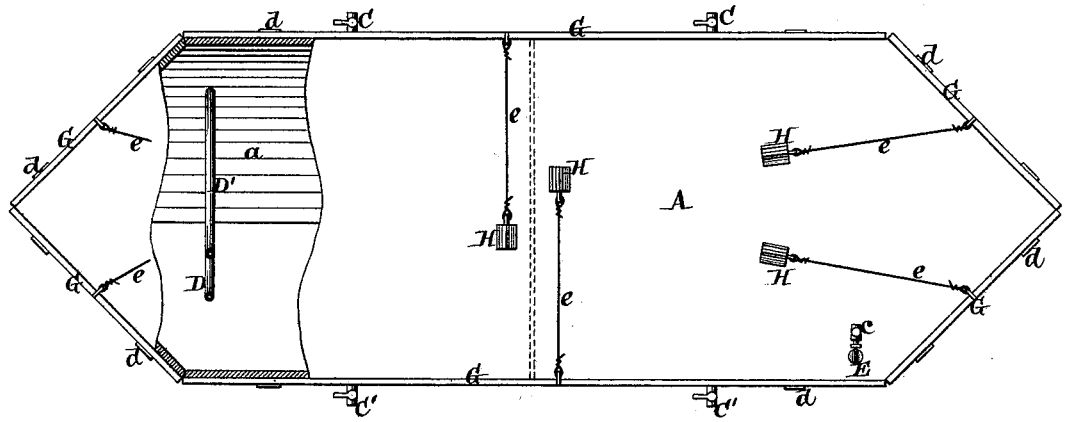
Figure 4:
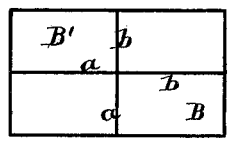

Figure 1 represents a vertical cross-section of a loaded scow containing my invention. Fig. 2 is a like section thereof when unloaded. Fig. 3 is a plan or top view of the same, partly in section. Fig. 4 shows a modification of the scow.

Similar letters indicate corresponding parts.

My invention consists in a scow for transporting mud, garbage, and other refuse or waste matter, which is reversible as to its top and bottom, so that either said top or said bottom is available for storage. The scow has two water-weighting chambers, one at or near each of its sides, which are provided with valves for the admission of water and for letting the water escape, so that either of such chambers can be filled with water, whereby the scow is made to capsize and discharge its load if it is loaded, while if, after the scow has capsized, the water is allowed to escape from the compartment which was previously filled, it immediately and automatically rights itself or assumes a horizontal position.

Each of the water-weighting compartments of the scow is provided with a vent for the admission of air when the water is allowed to escape, and also provided with a pipe or other means for its discharge when the water is let in.

It consists, also, in a movable bulwark which is made in sections and provided with anchors or other means for holding the same in place, so that the position of said bulwark may be changed as the scow is reversed in its position.

In the drawing, the letter A designates the body of my scow, which has a flat top and corresponding bottom, and in which are arranged partitions *a b*, so as to form chambers B B' at its opposite sides. The partitions *a b* may either be inclined, as shown in Figs. 1 and 2, or they may be arranged at right angles to the body of the scow, as shown in Fig. 4, as may be found most expedient. To each of the chambers B B' is connected a valve, C or C', of any suitable construction, and from said chambers, moreover, extend pipes D D' through the body of the scow and through each other, which said pipes are preferably each provided with a cock, *c*. With the chambers B B' are also combined vents E E'.

When the scow has been loaded it is towed to the spot where it is to be unloaded, and the valve C of the lowermost chamber, B, is opened, (referring to Fig. 1,) so as to allow said chamber B to fill with water, while at the same time the cock *c* of the pipe D, extending from said chamber B, is opened so as to allow the air to escape from the compartment as the water rushes in. It is obvious that when said compartment B becomes filled with water the scow is caused to capsize, and thus its load is discharged. When the scow has capsized the water is allowed to escape from the chamber B by the same valve, C, through which it was admitted, and the part of the same which constituted the bottom before such act is used as the top or deck. When the water escapes from the chamber B air is admitted thereto through the vent E, which latter may be made automatic in its operation if seen fit. The chambers B B' are respectively arranged near the top and bottom of the scow, as clearly shown, and the scow is so ballasted that when it is empty one of the chambers is above the level of the water. Thus, when the load is discharged, as before stated, the chamber B is brought above the water-level, as seen in Fig. 2, and if the valve C is allowed to remain open, the water readily escapes thereby.

Two or more valves, C or C', are used to each of the chambers B B', and said valves may be connected together by a rod, so that they can be opened and shut simultaneously and in one operation. The valves C or C', moreover, may be worked from the top of the scow alongside of it, in which case a small boat can be used.

With my scow is combined a movable bulwark, G, which is made in sections in order to adapt it to the shape of the scow, and which can be brought up alongside the top or deck as often as the scow is capsized. In the example shown, this bulwark G is connected to the sides of the scow by means of hinged arms *d*, so that it can be swung up to the required position after the scow has turned over; but I can also arrange the said bulwark to slide up and down on the sides of the scow. A windlass or any other suitable contrivance may be used for moving the bulwark. When the bulwark G is hinged to the scow, I retain the same in its higher position by means of anchors H, which are connected thereto by means of chains or ropes *e*, and which are simply thrown on the deck amidst the load, as indicated in Fig. 1; but any suitable form of catch may be substituted for the anchors.

I do not claim, broadly, as my invention a scow having combined with it one or more laterally-arranged water-weighting chambers or compartments and a valve or valves arranged for the dumping of the load by the partial turning over of the scow, such having been done before.

What I claim as new, and desire to secure by Letters Patent, is—

1. A reversible dumping-scow having water-weighting chambers on opposite sides, said chambers having inlet-valves, substantially as shown.

2. A dumping-scow provided with two decks, either adapted to carry the load while the other becomes the bottom of the vessel, said scow having a water-chamber at each side, inlet-valves, and an air-escape from each chamber through the opposite deck, substantially as shown.

3. The combination, with a reversible dumping-scow, of movable bulwarks adapted to be secured in position on the scow, whichever side of the scow is turned up, substantially as set forth.

4. The combination, with a reversible dumping-scow and with the movable bulwarks, of anchors and chains or ropes, whereby the bulwarks are retained in position by the action of the load on said anchors, substantially as described.

In testimony that I claim the foregoing I have hereunto set my hand and seal this 21st day of February, A. D. 1877.

CHAS. C. OVERTON. [L. S.]

Witnesses:
 E. F. KASTENHUBER,
 CHAS. WAHLERS.